(12) United States Patent
Cheng

(10) Patent No.: US 9,128,983 B2
(45) Date of Patent: Sep. 8, 2015

(54) SYSTEMS AND METHODS FOR QUERY OPTIMIZATION

(75) Inventor: Tao-Jung Cheng, Herndon, VA (US)

(73) Assignee: AOL Inc., Dulles, VA (US)

(*) Notice: Subject to any disclaimer, the term of this patent is extended or adjusted under 35 U.S.C. 154(b) by 732 days.

(21) Appl. No.: 13/271,561

(22) Filed: Oct. 12, 2011

(65) Prior Publication Data

US 2012/0095987 A1    Apr. 19, 2012

Related U.S. Application Data

(60) Provisional application No. 61/392,869, filed on Oct. 13, 2010.

(51) Int. Cl.
  *G06F 7/00*    (2006.01)
  *G06F 17/30*    (2006.01)

(52) U.S. Cl.
  CPC ................ *G06F 17/30442* (2013.01)

(58) Field of Classification Search
  CPC .............. G06F 17/30442; G06F 17/30; G06F 17/30463; G06F 17/30477; G06F 17/30427; G06F 17/30445; G06F 17/30471; G06F 17/30864; G06F 17/30289; G06F 17/30448; G06F 17/30451; G06F 17/3056; G06F 11/348
  USPC ........................................................ 707/713
  See application file for complete search history.

(56) References Cited

U.S. PATENT DOCUMENTS

2008/0301130 A1* 12/2008 Fontoura et al. .................. 707/5
2009/0037405 A1*  2/2009 Lee et al. .......................... 707/5

* cited by examiner

*Primary Examiner* — Truong Vo
(74) *Attorney, Agent, or Firm* — Finnegan, Henderson, Farabow, Garrett & Dunner LLP

(57) ABSTRACT

In accordance with certain embodiments, a query from a client may be received at a server, and a default query range may be applied to the query. The query may be executed in a first execution using an index comprising a category of information stored in the database and subject to the default query range. If the number of query results from the first execution is outside a predetermined range, then the query range may be adjusted to obtain a number of query results closer to or within the predetermined range. Additionally, the query may be executed in a second execution using the index comprising the category of information stored in the database and subject to the adjusted query range. Thereafter, the query results obtained from the second execution of the query may be sent to the client.

22 Claims, 8 Drawing Sheets

200

| Entity ID | Topic ID | Pointer | Timestamp |
|---|---|---|---|
| NFL-Redskins | Donovan McNabb | V0022398 | 2010-04-03-11-23-44 |
| NFL-Redskins | Donovan McNabb | V0022400 | 2010-04-06-18-43-39 |
| Obama | Speech | V0087390 | 2010-02-01-05-36-18 |
| Italy | Rome | X9083839 | 2010-05-23-12-48-33 |
| Italy | Sicily | X9083850 | 2010-07-13-07-08-22 |
| Julia Roberts | Sightings | X6088727 | 2010-03-21-17-42-31 |
| Beethoven | Symphonies | X0987349 | 2010-04-23-10-40-55 |

Columns: 201 (Entity ID), 202 (Topic ID), 203 (Pointer), 204 (Timestamp)

| Entity ID | Topic ID | Search Query | Query ID | Query Range |
|---|---|---|---|---|
| NFL-Redskins | Donovan McNabb | mcnabb | NFL13205 | 2.5 |
| NFL-Redskins | Donovan McNabb | redskins quarterback | NFL13206 | 2.5 |
| Obama | Speech | obama | POL01011 | 1 |
| Italy | Rome | colosseum | ITL39432 | |
| Italy | Sicily | sicily | ITL39558 | |
| Julia Roberts | Sightings | | | |
| Beethoven | Symphonies | | | 55 |

401 — Entity ID
402 — Topic ID
403 — Search Query
404 — Query ID
405 — Query Range

*Fig. 4*

|   | 700 | |
|---|---|---|
| 701 | 702 | 703 |

| Query Criteria Hash Value | Query Range | Query Criteria String Value |
|---|---|---|
| 3ba78d1a1068ffbf952abeef08 64f28f | 0.05 | &entityName=Obama&fSrcGrp=news& fRelevance=50 |
| 4e96309d99547f1d2f3a5bce7 66c8307 | 0.01 | &entityName=Obama&fSrcGrp=blog &fRelevance=50 |
| 3ba78d1a1068ffbf952abeef08 64f28f | 2.0 | &entityName=Obama&fSrcGrp=aolHost ed &fRelevance=53&fOnO=1 |
| 4e96309d99547f1d2f3a5bce7 66c8307 | 0.9 | &entityName=madonna&fSrcGrp=1 &fRelevance=10 |
| 5ddce281a749cd311709c0aa c2c3ee86 | 0.5 | &entityName=justin&fSrcGrp=1 &fRelevance=50 |
| 37df00c3cd3448462091c277 184cc205 | 1.5 | &entityName=tayor swift&fSrcGrp=1 &fRelevance=50 |
| c2dd1300668b66c96b6c5c90 d14dc1ad | 22 | &entityName=Obama&fSrcGrp=entertai nment &fRelevance=30 |

*Fig. 7*

SYSTEMS AND METHODS FOR QUERY OPTIMIZATION

RELATED APPLICATION(S)

This application claims the benefit of priority of U.S. Provisional Patent Application No. 61/392,869, filed on Oct. 13, 2010. The disclosure of the above-referenced application is expressly incorporated herein by reference to its entirety.

TECHNICAL FIELD

The present disclosure relates to computerized systems and methods for optimizing queries, such as queries for online searches. More particularly, and without limitation, the present disclosure relates to systems and methods for heuristic algorithms for query optimization.

BACKGROUND

The task of finding relevant data among vast numbers of documents, articles, websites, and other content can be daunting. Databases that contain large numbers of entries are often time-consuming and costly to query. Further, in complex systems, databases may be continually updated with new data, and existing documents, articles, websites, or other content may be modified or deleted. A simple query on a large database could take several hours, if not days, to perform.

The task of searching for the most recent clusters of related data (e.g., websites or news articles pertaining to the same professional football team) presents additional challenges. For example, if the search is conditioned on both the name of the football team and a date or time range, the search will require more processing, and hence more time, more hardware usage, and more cost.

One solution, albeit flawed, to the challenge of searching for the most recent data of a given type is to pre-compute the search and store the results in a database or cache. In this approach, a subsequent search may quickly access the stored results without having to run a new search.

But the drawbacks of this purported solution are significant. For one thing, the solution is ineffective when the data being queried is regularly updated, because the stored search results will not be able to account for newly added, modified, or deleted records. Another problem is that different querying applications (e.g., web search engines, social media search functionality, online "fan page" search functionality, etc.) may have different needs in querying the data, and therefore pre-computed search results may be relevant to one application's needs but less relevant to another application's needs.

Furthermore, the filtering properties of any given application may change over time. For example, an application may need to query the data with filters based on date, keywords, author, URL, peer reviews, etc. Pre-computed search results would again fail to deliver relevant results. Moreover, if the cache in which pre-computed data is stored experienced a software or hardware failure, the pre-computed search results would no longer be accessible, and a high volume of incoming queries would quickly overwhelm the query system.

BRIEF DESCRIPTION OF THE DRAWINGS

The accompanying drawings, which are incorporated in and constitute part of this specification, and together with the description, illustrate and serve to explain the principles of various exemplary embodiments.

FIG. 2 illustrates an exemplary data storage configuration 200 for implementing embodiments and aspects of the present disclosure.

FIG. 4 illustrates an exemplary data storage configuration 400 for implementing embodiments and aspects of the present disclosure.

FIG. 7 illustrates an exemplary data storage configuration 700 for implementing embodiments and aspects of the present disclosure.

DETAILED DESCRIPTION

Reference will now be made in detail to the present exemplary embodiments of the present disclosure, examples of which are illustrated in the accompanying drawings. Wherever possible, the same reference numbers will be used throughout the drawings to refer to the same or like parts.

Figure 1:
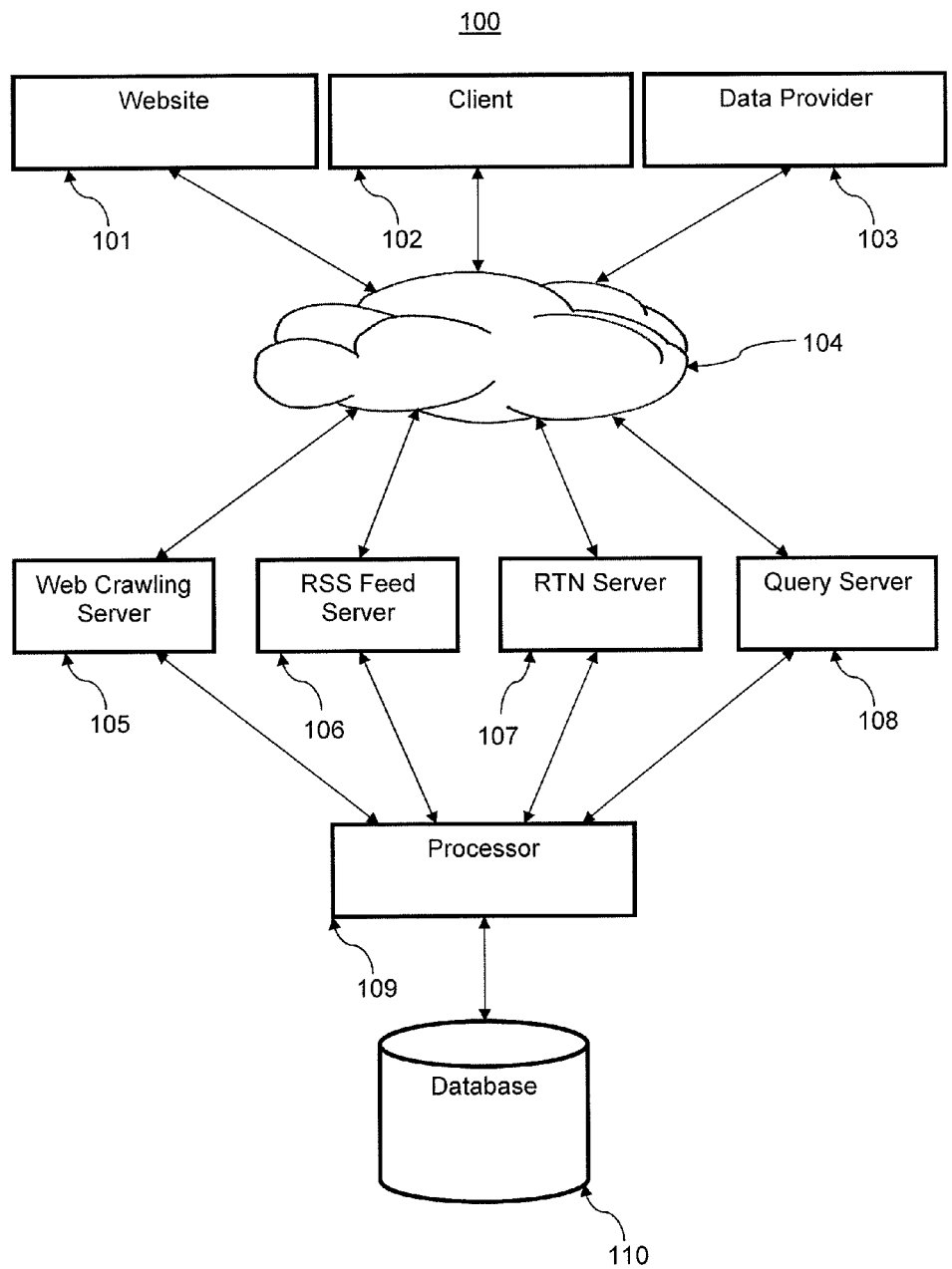
FIG. 1 is a block diagram of an exemplary system 100 for implementing embodiments and aspects of the present disclosure.

FIG. 1 is a block diagram of an exemplary system 100 for implementing embodiments and aspects of the present disclosure. System 100 may include one or more websites 101, clients 102, and/or data providers 103.

Websites 101 may include a wide variety of websites, such as news websites, sports websites, celebrity gossip websites, political websites, social networking websites, etc. In some embodiments, websites 101 may be implemented using HTML, XHTML, JAVA®, ASP, ColdFusion, etc., and/or combinations thereof. Websites 101 may change periodically, or may remain static for extended periods of time. In some embodiments, websites 101 may provide their URLs to web crawlers (e.g., spiders) for indexing and web searching. Websites 101 may also be indexed by web crawlers unbeknownst to them.

Websites 101 may be implemented with web servers that serve web content to and/or through a communications medium 104. In certain embodiments, communications medium 104 includes any combination of communications networks. For example, communications medium 104 may include the Internet or another type of wide area network, an intranet, a metropolitan area network, a local area network, etc.

As further shown in FIG. 1, system 100 may also include one or more clients 102. Clients 102 may be implemented with devices, and/or applications running thereon. Client devices 102 may include personal computers, laptops, tablet computers, personal digital assistants, mobile telephones, or multiple other types of communicating devices, etc. Clients 102 may be configured to communicate to and/or through communications medium 104. In some embodiments, as discussed further below, clients 102 may be configured to request or initiate search queries, such as web searches, news searches, social media searches, and various other types of searches. Such queries may be generated by clients 102, and such requests may be transmitted through communications medium 104 to an appropriate server, such as, for example, a query server 108.

System 100 may also include one or more data providers 103. Data providers 103 may be sources of information, such as general news, sports information, political news, celebrity gossip, entertainment news, automotive news, financial updates, etc. Data providers 103 may include really simple syndication (RSS) networks, which may offer subscriptions that provide regularly updated information to subscribers. Data providers 103 may also include other types of subscription information services, such as Thomson Reuters®, Bloomberg®, Dow Jones® Newswires, Associated Press®, Twitter®, ESPN® News Feeds, etc., as well as free or non-subscription services (e.g., free news websites, blogs, scholarly articles, patent publications, etc.).

In some embodiments, data providers 103 may provide data directly to clients 102 or websites 101. Additionally, or alternatively, in some embodiments data providers 103 may provide data to appropriate servers (e.g., servers 105, 106, 107, and/or 108) and store the data in a database (e.g., database 110).

Server 105 may include one or more servers configured to crawl a communications network (e.g., the Internet), and archive or index the documents or other content (e.g., webpages) it visits. The crawling may occur, for example, with a list of seed URLs to visit, and may progress by harvesting all links found on the URLs visited. The crawling may then proceed to the harvested links, gather additional links, and continue the iterative crawling process. Documents and other content that have been archived or indexed in the crawling process may be available for searching, e.g., with Internet search engines, database search engines, and/or any other types of search engines. In some embodiments, the archiving and indexing is performed by the server 105, and in other embodiments the archiving and indexing is performed by a separate processor (e.g., processor 109), or any combination thereof. In addition, consistent with some embodiments, each server 105 may include a server, a server system comprising a plurality of servers, or a server farm comprising a load balancing system and a plurality of servers.

Server 106 may include one or more RSS feed servers configured to receive RSS information from RSS data providers (e.g., data providers 103). RSS information that is received may be appropriately indexed and stored in a database (e.g., database 110), as discussed further below. For example, in embodiments where incoming data received at server 106 is intended to be displayed on a "fan website" (e.g., a fan website devoted to the actress Julia Roberts), the data may be indexed in a database according to fields such as the date the information was published, the date the information was last updated, the author of the information, the title or headline of the information, the keywords appearing in the information, the URL from which the information came, etc. The indexed data may include an "entity ID," as discussed further below, which may identify the subject of the information. For example, in this case, the entity ID may be "Julia Roberts." In some embodiments, the indexing is performed by server 106. Additionally, or alternatively, in other embodiments, the indexing is performed by a separate processor (e.g., processor 109). In addition, consistent with some embodiments, each server 106 may include a server, a server system comprising a plurality of servers, or a server farm comprising a load balancing system and a plurality of servers.

Server 107 may include one or more real time news (RTN) servers, configured to receive news information at or near the time the information was published or otherwise reported. For example, servers 107 may search for, or passively receive information from, data providers such as data providers 103. The information received at servers 107 may be received pursuant to a subscription, or may be freely available to the public. The information received at servers 107 may be indexed and stored in a database (e.g., database 110). The indexing may occur in a similar fashion to the indexing described above with respect to servers 105 and 106. In some embodiments the indexing is performed by server 107. Additionally, or alternatively, in other embodiments the indexing is performed by a separate processor (e.g., processor 109). Consistent with some embodiments, each server 107 may include a server, a server system comprising a plurality of servers, or a server farm comprising a load balancing system and a plurality of servers.

Query server 108 may include one or more query servers configured to receive queries. For example, queries received at server 108 may be received from websites 101 or clients 102. Servers 108 may be in communication with one or more processors 109, which may execute queries (e.g., apply query filters and conditions, invoke query indexes, sort query results, etc.). Processor 109 may be internal to server 108, internal to database 110, or may be an external processing component. The types of query processing performed by processor 109 are described further below.

Database 110 may include one or more logically and/or physically separate databases configured to store data. The data stored in databases 110 may be received from servers 105, 106, 107, and/or 108, and/or directly from websites 101, clients 102, and/or data providers 103. The data stored in databases 110 may take various forms including, but not limited to, documents, articles, postings, images, videos, music, maps, websites, webpages, and/or other content, as well as combinations or hybrids thereof. In embodiments where database 110 stores documents (e.g., webpages, Internet news articles, blogs, Twitter Tweets®, combinations or hybrids thereof, etc.) received from or through communications medium 104, the documents and other content themselves may be stored together with data pertaining to them, or may be stored separate from such data. In embodiments where the documents and other content are stored separate from the data pertaining to them, for example, database 110 may store pointers or URLs to the locations of the actual documents and other content.

In some embodiments, database 110 may be implemented using a single computer-readable storage medium. In other embodiments, database 110 may be maintained in network attached storage, in a storage area network, combinations thereof, etc. Database 110 may be maintained and queried using numerous types of database software and programming languages, such as SQL, MySQL, IBM DB2®, Microsoft Access®, PERL, C/C++, Java®, etc.

FIG. 2 illustrates an exemplary data storage configuration 200 for implementing embodiments and aspects of the present disclosure. With reference to FIG. 1, data storage configuration 200 may, in some embodiments, depict an exemplary storage arrangement for data stored in database 110. The configuration 200 may comprise multiple rows and columns of data, which may be structured or partially structured data. One exemplary column in configuration 200 may be an entity ID 201. In some embodiments, the entity ID 201 may indicate the subject of information stored in the database. For example, where a website is maintained with up-to-date news articles and other content about the Washington Redskins® football team, the entity ID 201 may indicate that "NFL Redskins" is the subject of information stored in the database. The information may be searched for based on the entity ID 201 of "NFL Redskins."

In some embodiments, the entity ID 201 field, topic ID field 202, and/or pointer field 203 may serve as the primary key of the database, for use in indexed searching. Such a primary key may allow documents, articles, videos, etc. in the database to be accessible as clusters according to their subject matter. In some embodiments, a secondary key may be based on the entity ID field 201 and/or timestamp field 204, in order to facilitate searches for the most recent documents pertaining to any given entity ID 201. Use of such a secondary key may narrow the number of rows/documents subject to a given query, thus improving processing performance. Techniques of indexed searching are discussed further below.

In some embodiments, multiple entity IDs 201 may be associated with any given document or other content. For example, a video pertaining to "Barak Obama" may be associated with both the "Obama" entity ID 201, and one or more other entity IDs 201 (e.g., "Politics," "Washington D.C.," "Election 2010," etc.).

Configuration 200 may also include a topic ID field 202. The topic ID field 202, in some embodiments, may include additional information about the entity ID field 201. For example, if the entity ID 201 for a given document is "Italy," the topic ID 202 may be "Rome," "Sicily," etc. In such an example, the general topic of a document (e.g., an online travel article, or a news article) may be indicated by the entity ID 201, and a more precise topic may be indicated by the topic ID 202. The topic ID 202 may represent a thread or cluster of articles, videos, and/or other documents that relate to a given subject or topic (e.g., a particular restaurant, actor, city, musical group, etc.). Any given topic ID 202 may be associated with multiple articles, documents, videos, etc.

Configuration 200 may also include a pointer field 203. For example, in embodiments where documents are stored separate (either physically or logically) from the data pertaining to them, pointers 203 may be used to indicate where the documents themselves are stored. In some embodiments, for example, the first letter of the pointer 203 may specify a network storage drive (e.g., drives labeled the "V drive," the "X drive," etc.), and the following numbers may indicate a location within the storage drive. Various other embodiments of pointers 203 (e.g., use of file path names, URLs, etc.) are possible as well.

Configuration 200 may also include a timestamp field 204, which may indicate date and/or time information associated with a document or other content stored in the database. For example, the timestamp 204 may indicate when a document was first published, when a document was last updated, when a document was stored in the database, when a document is scheduled to expire or be deleted from the database, when a document was accessed from the database (e.g., to publish or link to on a website), etc. In some embodiments, as depicted in configuration 200, timestamp 204 may be formatted in the yyyy-mm-dd-hh-mm-ss format. In other embodiments, variations of such format may be used, or other proprietary date/time formats may be used (e.g., encoded data indicating a date/time).

In some embodiments, configuration 200 may also contain numerous other types of data fields. One such additional field may be a metadata field that provides information about a document or other content. For example, with respect to a documents, the metadata field may include information pertaining the various historical modifications to a document, a document's author, the copyright information for a document, a document's word count and/or page count, etc. In some embodiments, these and other types of fields may be stored in separate tables in the database, rather than in a metadata table.

Figure 3:
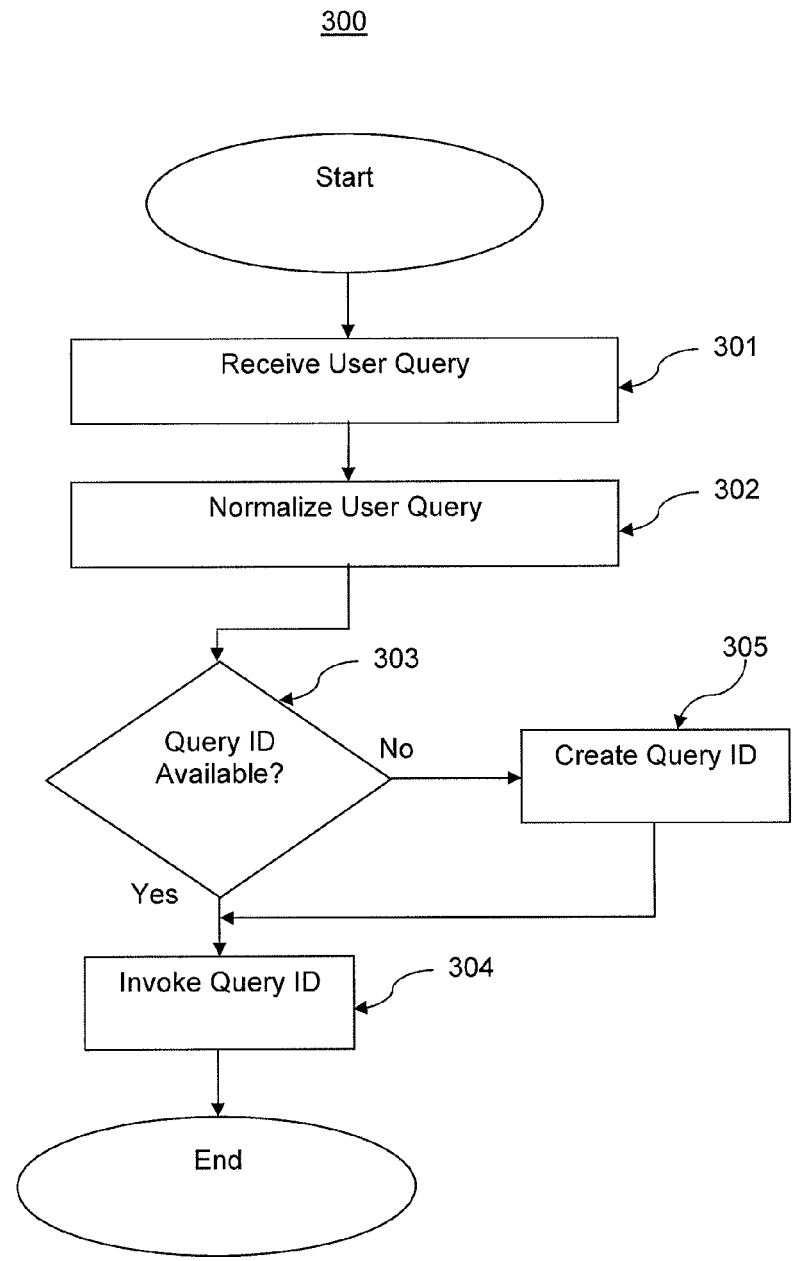
FIG. 3 is a flowchart of an exemplary process 300 for implementing embodiments and aspects of the present disclosure.

FIG. 3 is a flowchart of an exemplary process 300 for implementing embodiments and aspects of the present disclosure. Process 300 may include a step 301 of receiving a user query. As discussed above with reference to FIG. 1, the query may come from a website 101, client 102, etc., and may be transmitted through communications medium 104 to an appropriate server (e.g., query server 108). For example, the query may come from a user visiting an Internet search engine website, a social media website (e.g., TV Guide®, Entertainment Weekly®, Twitter®, Facebook®, etc.), a "fan webpage," etc. The user query may be a simple free text search (e.g., "ludwig van beethoven"), or may be a conditional search (e.g., "ludwig van beethoven" within the category of "blog articles" and a within the further category of "free articles"). Other conditions may include, for example, a time of publication, a time of last modification, an author, an entity ID (e.g., entity ID 201, from FIG. 2), a topic ID (e.g., topic ID 203, from FIG. 2), a popularity ranking (e.g., a ranking reflecting how many unique visitors have viewed the document), etc.

Process 300 may also include a step 302 of normalizing the user query. Normalizing a query may involve, for example, changing capital letters to lowercase letters (e.g., "T" to "t"), applying Boolean logic query conditions (e.g., "Italian restaurant' NOT pizza"), applying special query operators (e.g., expanding "motorcycl!" to include "motorcycle," "motorcycling," "motorcycles," etc.), correcting common typographical errors (e.g., correcting "philladelphia" to "philadelphia"), etc.

Process 300 may also include a step 303 of determining whether a query ID is available for a given query (e.g., before, after, or without normalizing the query in step 302). A query ID may be a unique identifier associated with any given query. For example, the queries "netherlands" and "holland" may each have their own unique query ID. With reference to FIG. 1, the query ID may be stored in database 110, or in a separate database. The query ID may be comprised of letters, numbers, special characters, and/or combinations thereof.

If in step 303 it is determined that a query ID is available for a given query (e.g., the query ID for the query is already stored in a database), the query ID may be invoked in a step 304. If no query ID is available for the query (e.g., the query has never been requested before, or for some other reason no query ID is stored in the database for it), a query ID may be created for the query and stored in the database. If the same query is subsequently requested, the query ID may then be invoked in step 304. Invoking the query in step 304 may involve accessing the query ID from the database and/or any data associated with the query, as discussed further below in relation to FIG. 4.

FIG. 4 illustrates an exemplary data storage configuration 400 for implementing embodiments and aspects of the present disclosure. With reference to FIG. 4, data storage configuration 400 may, in some embodiments, depict how the query ID discussed above with respect to FIG. 3 may be stored in a database. The entity ID 401 and topic ID 402 were discussed above with respect to FIG. 2. Similar data fields may be stored in configuration 400 as well, and in some embodiments either field may serve as a primary key. For example, in some embodiments, the entity ID 401 may serve as a primary key, and may serve to link the data in configuration 400 with the data configuration described with respect to FIG. 2.

Configuration 400 may also include a search query field 403 and a query ID field 404. As described above with reference to FIG. 3, the search query field 403 may contain stored search queries (e.g., before, after, or without normalizing the queries). In some embodiments, query field 403 may include both query terms (e.g., "mcnabb") and other query criteria (e.g., query filters, query operators, query constraints, etc.). The query ID field 404 may contain a unique identifier that identifies the search query. In some embodiments, the query ID 404 may contain a prefix or leading character(s) that indicate a category of the search (e.g., "NFL" for professional football, "POL" for politics, "ITL" for Italy, etc.). Subsequent characters (e.g., "13" in "NFL13205") may indicate a particular professional football team, such as the Washington Redskins®, and further characters (e.g., "205") may indicate a particular player, such as Donovan McNabb. For some entity IDs 401 and/or topic IDs 402, there may be no saved query ID 404 if a search has not yet been associated with the entity IDs 401 and/or topic IDs 402.

Figure 5:
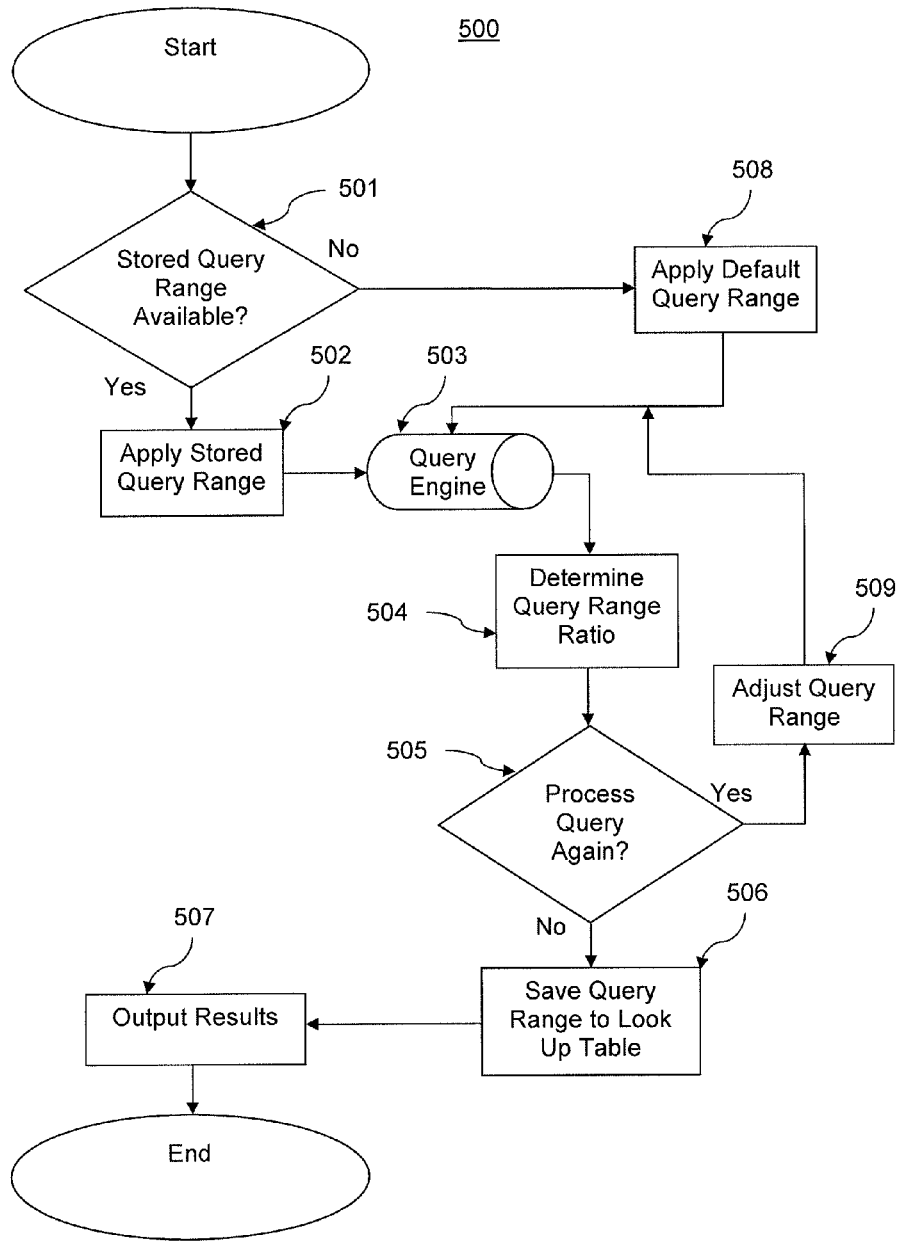
FIG. 5 is a flowchart of an exemplary process 500 for implementing embodiments and aspects of the present disclosure.

FIG. 5 is a flowchart of an exemplary process 500 for implementing embodiments and aspects of the present disclosure. In some embodiments, process 500 may be configured to process a query and output query results. For example, with regard to FIG. 1, process 500 may be performed by query server 108 and/or processor 109 upon data stored in database 110.

Process 500 may include a step 501 of determining whether a stored query range is available. A stored query range may be available, for example, if process 500 has already been executed for a given query. A stored query range, may be stored, with reference to FIG. 4, in a query range field 405, as an example.

A query range may be a limiting condition for a query of data in the database. The query range may be, for example, a time period, date range, or relevance score, etc. For example, if the query range is a time period, the time period may constrain the query to only return documents for which a timestamp (e.g., timestamp 202, with reference to FIG. 2) falls within the time period. If, for example, the query range is "2.5," in some embodiments this may indicate that the query range is 2.5 hours, although in other embodiments, the query range may be specified in seconds, minutes, days, combinations thereof, etc. If the timestamp of data records falls within the query range (e.g., the documents were published within the last 2.5 hours), the documents may satisfy the query range condition, and therefore may be turned up in a query, as discussed further below. If the documents' timestamps fall outside the query range, they may excluded from a query (e.g., an indexed query of the database). In some embodiments, some query range fields in the database may be blank, or otherwise indicate that no query range has been stored (e.g., "NULL" or "NA"). Query ranges may be updated periodically or may remain static for extended periods.

If a stored query range is available for a given query, the query range may be applied in a step 502. For example, applying a query range may involve binding the queried search terms to the query range and sending the query to the search engine in a step 503. As an example, if the query range is three hours, the query sent to the search engine may turn up only documents that have been published or modified within the past three hours in step 503.

The query engine may search the database for records subject to the query range. In some embodiments, the search engine may use an index to perform the search. For example, with reference to FIGS. 2 and 4, the entity ID may serve as an index field upon which an indexed query can run. In this manner, the query engine would only have to process the entity ID column of data, rather than all columns in the database. As a constraint on the query, the query range may be used to limit the indexed query to only those records for which the query range is satisfied. For example, the query range may be applied to only search for results where the timestamp 202 falls within the query range. In some embodiments, the timestamp data 202 may be sorted from newest to oldest in the database, so that the query engine need only process a portion of the timestamp data 202 rather than all timestamp data 202 (e.g., once the first timestamp entry 202 outside the query range is encountered, the query may end, on the assumption that all following timestamp data 202 are also outside the query range).

Process 500 may also include a step 504 of determining the query range ratio for a given query range and a given query. In some embodiments, the query range ratio may be determined by dividing the number of data records returned by the query engine by the query range. For example, where T is the query range and N is the number of data records returned, the query range ratio, R, may be determined as follows:

$$R=N/T$$

Where the query range is measured in hours, the query range ratio may be expressed in units of documents or other content per hour. A low query range ratio may indicate that few documents or other content have been recently published or modified that are relevant to a given query, and a high query range ratio may indicate than many documents or other content have been recently published or modified for a given query.

Process 500 may also include a step 505 of determining whether to process the query again. The various conditions that may be involved in step 505 are discussed below with reference to FIG. 6. As a few examples, step 505 may involve determining whether a sufficient number of documents or other content have been returned. If an insufficient number of documents or other content have been returned, the query range may be adjusted accordingly (e.g., decrease to decrease the ratio, or increased to increase the ratio). Also, or alternatively, step 505 may involve counting the number of trips made to the query engine in process 500 for any given query. If, for example, the number of trips to the query engine is two or more, the original query may be sent to the query engine so as to not involve further processing.

Process 500 may also include a step 506 of saving the query range to a look up table or future use. For example, the query range saved to the look up table may be the final query range applied to the query engine, and used to output results in step 507. In some embodiments, the query range may be saved in a database (e.g., in field 405 of FIG. 4), and in other embodiments the query range may be stored in a separate look up table. By storing the query range in a look up table, the query range may be used for future queries involving the same query content (e.g., future queries that are the same as the query being processed in process 500, or future queries deemed to be equivalent), without requiring a new query range to be determined in process 500. Accordingly, the query range can be determined from the look up table and applied in a query to the query engine. In some embodiments, different query ranges may be associated with different types of content (e.g., webpages, images, videos, news bulletins, etc.). In additional embodiments, different query ranges may be associated with different combinations of content types (e.g., webpages containing video, news articles containing images, etc.). In further embodiments, query ranges may be associated with genres, or combinations of genres, of content (e.g., sports articles, breaking news, politics, regulatory news, celebrity sightings, etc.).

Process 500 may also include a step 507 of outputting query results. For example, with reference to FIG. 1, the query results may be sent to a website 101, client 102, etc., via communications medium 104. As discussed further below, the query results may be displayed on a results screen of a graphical interface, such as a graphical user interface (GUI).

Referring again to step 501, if it is determined that no stored query range is available (e.g., already stored in a database or look up table), a default query range may be applied in a step 508. The default query range may be arbitrarily selected, or may be selected empirically. For example, in an empirical approach, query results may be observed over time, and it may be determined how many results are returned for a given query or a set of different queries. Depending on how many results are deemed appropriate to output in step 507, the query range can be adjusted to output greater or fewer results. For instance, it may be desirable to select a global default query range ratio (i.e., the default query range for all queries) such that, for half of all queries, one fourth of the total relevant data records will be returned. The global default query range may be raised (e.g., from 4 hours to 6 hours) to increase the number of records returned and raise the global query range ratio, and vice versa.

In some embodiments, different default query ranges may be determined for different types of queries and/or types of content (e.g., webpages, images, videos, etc.). For example, different default query ranges may be determined for different types of entity IDs, topic IDs, and/or query IDs, etc. In that manner, query ranges may be more closely matched to the subject matter queries, and thus may provide better starting points for determining an appropriate query range in process 500. For example, a popular query subject (e.g., "madonna") may have a lower default query range than a less popular subject (e.g., "nietzsche"). In some embodiments, default query ranges may be associated with single genres, or combinations of genres, of content (e.g., politics, sports, world news, celebrity gossip, etc.).

In some embodiments, different types of content being queried (e.g., webpages, videos, blog articles, combinations thereof, etc.) may have different default query ranges. For example, the default query range for a query for Twitter® posts may be smaller than the default query range for video files, given the smaller display size of a Twitter® post compared to a video file, its smaller bandwidth, and/or its higher publication frequency, etc. In some embodiments, default query ranges may be associated with multiple types of content, such as documents, images, videos, blogs, Twiter® postings, etc., as well as combinations thereof. For example, blogs may have one default query range, while document/video combinations may have another default query range.

The query may then be processed by the query engine in a step 503 using the default query range. The query may be indexed as described above (e.g., indexed based on entity ID, topic ID, etc.), and limited by the query range. The query range ratio may then be determined in step 505, in a similar manner to that described above.

Process 500 may then proceed to step 505, in which it is determined whether to process the query again. Step 505 may involve the same considerations discussed above, and as further discussed below with reference to FIG. 6.

If it is determined in step 505 that the query should be processed again (e.g., too many or too few results were returned), process 500 may proceed to a step 509 of adjusting the query range. In step 509, the query range may be adjusted (e.g., changed from the default query range) to yield fewer or greater search results. For example, the range may be increased to yield a greater number of results, and lowered to return a lower number of results.

In some embodiments, the query range may be adjusted according to preset gradations. For example, the query range may be raised or lowered by increments of one hour, one day, one week, etc. In other embodiments, a rough measure of the adjustment may be determined based on the number of results returned and/or the query range ratio. For example, if it is deemed desirable to return 1,000 documents, and 5,000 documents were returned, the query range may be reduced by a factor of five (e.g., from 5 hours to 1 hour). In other embodiments, the excess number of documents (here, 4,000) may be compared to the total number of documents that would be returned but for the query range, and the query range may be adjusted proportionately. In the example above, if 10,000 documents would be returned without any query range, the 4,000 excess documents would be 40% of the total number of relevant documents, and the query range could be lowered by 40%. Numerous other methods for raising or lowering the query range, including variations of foregoing, could be used as well.

With the query range adjusted, process 500 may proceed to a step 503, in which the query is executed by the query engine. Process 500 may then proceed to steps 504, 505, 506, 507, and/or 509, as described above.

Figure 6:
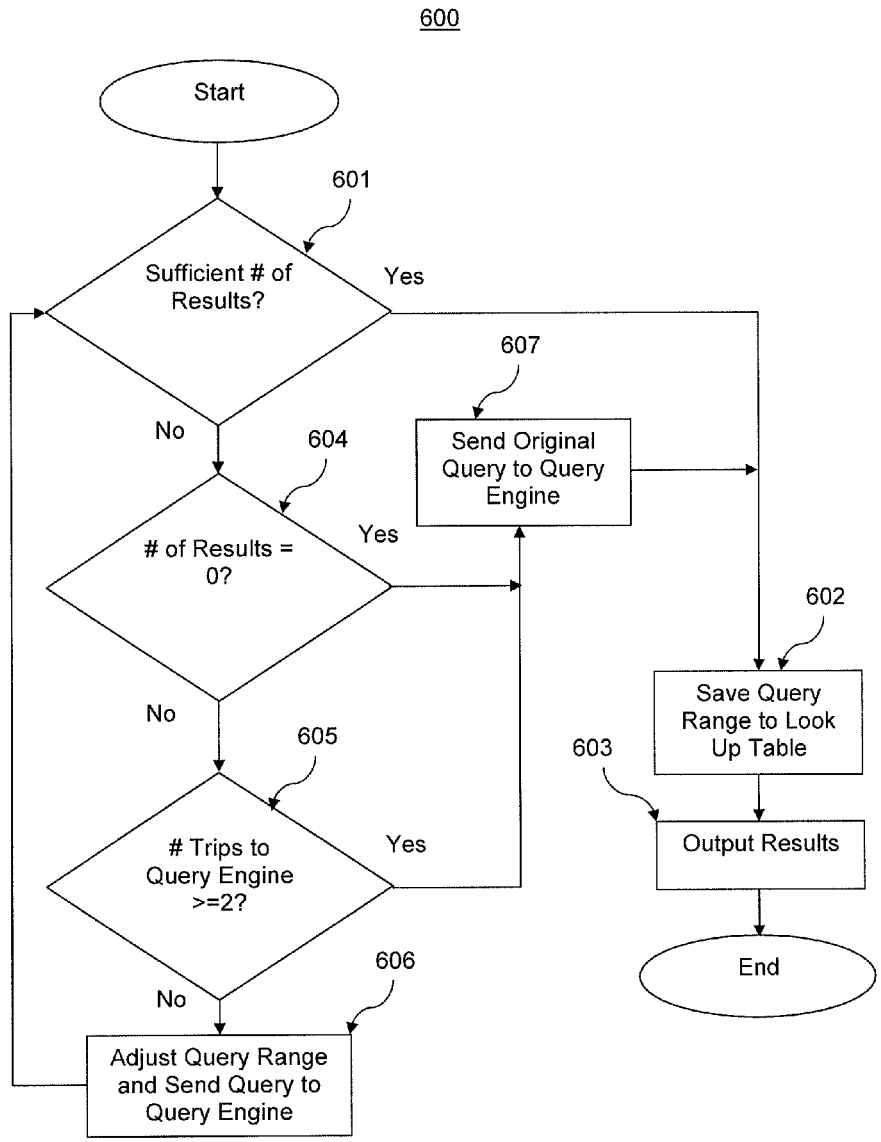
FIG. 6 is a flowchart of an exemplary process 600 for implementing embodiments and aspects of the present disclosure.

FIG. 6 is a flowchart of an exemplary process 600 for implementing embodiments and aspects of the present disclosure. In some embodiments, for example, process 600 may correspond to step 505 of FIG. 5, and its related steps. With reference to FIG. 1, for example, process 600 may be performed by query server 108 and/or processor 109 upon data stored in database 110.

Process 600 may include a step 601 of determining whether a sufficient number of query results are obtained from a query executed by the query engine (e.g., in step 503 of FIG. 5). In some embodiments, a system administrator may determine the appropriate number of query results to obtain, which may be based on considerations such as the layout of the webpage on which they will be presented to a user. In other embodiments, users (e.g., users of clients 102 in FIG. 1) may specify how many query results to obtain. If a sufficient number of query results are obtained, process 600 may involve a step 602 of saving the query range that yielded the query results to a look up table. The process of saving the query range to a look up table was described above. The query results may then be presented to a user (e.g., webpage 101, client 102, with reference to FIG. 1) in a step 603. In some embodiments, step 601 involves determining the query range ratio associated with a given query executed upon the query engine, and determining whether query range ratio exceeds a preset threshold query range ratio. The query range ratio may be set in an empirical fashion, e.g., based on observing the performance of queries and determining an appropriate number of documents to be returned for a given query. In some embodiments, the query range ratio may be set based on a user preference indicating a query range and/or a number of documents to receive in a query.

If in step 601 it is determined that an insufficient number of query results were obtained from the query, process 600 may proceed to a step 604 of determining whether the number of results is zero. If zero query results were obtained, process 600 may proceed to step 607, in which the original query is sent to the query engine.

If in step 604 it is determined that at least some query results were returned, it may be determined in a step 605 whether the number of trips to the query engine is equal to or greater than two. If two or more trips to the query engine have already been made, process 600 may proceed to a step 607 of sending the original query to the query engine, so as to not require further processing. The query range may then be saved to the look up table in step 602, and the results may be sent to a user in step 603.

If in step 605 it is determined that the number of trips to the query engine is less than two, process 600 may proceed to step 606, and adjust the query range. The query range may be adjusted as described above, and the query may be run again at the query engine. In this manner, a maximum of three trips to the query engine would be used for any given query. It should be appreciated, however, that the maximum number of trips to the query engine may be different in different embodiments. For example, where processing resources are in high demand, perhaps only two trips would be allowed. In other embodiments, many more trips may be allowed. Additional trips to the query engine will have the effect of more precisely determining the query range, but will come at the cost of processing power and time.

FIG. 7 illustrates an exemplary data storage configuration 700 for implementing embodiments and aspects of the present disclosure. With reference to FIG. 1, data storage configuration 700 may, in some embodiments, depict an exemplary storage arrangement for data stored in database 110. In some embodiments, configuration 700 may comprise a hash table or map, for use in determining stored query ranges, as discussed above, and using them for subsequent queries. Using such a hash map may allow subsequent queries to invoke a pre-stored query range, where, for example, the subsequent query is the same as (or deemed to be similar to) a previous query.

Configuration 700 may include a query criteria hash value field 701. In some embodiments, hash values 701 may be mapped to a query ID (e.g., query ID 404, with reference to FIG. 4). In some embodiments, hash values 701 are each associated with only one query ID, and in other embodiments hash values 701 are associated with multiple query IDs. As an example, the hash values 701 may be computed from the concatenation of entity ID, topic ID, search query contents, and/or other query criteria. Configuration 700 may be keyed using the hash values 701, which are used to retrieve stored query ranges.

Configuration 700 may also include a query range field 702. Query ranges, and the processes for determining and storing them, were discussed above.

Configuration 700 may also include a query criteria string value field 703. In some embodiments, string value field 703 stores concatenated strings of all query criteria. For example, string values 703 may indicate the content of a query, query filtering criteria (e.g., "news," "blog," etc.), query relevance scores, etc. In some embodiments, the string values 703 are used for human reference, to determine the characteristics of queries.

Figure 8A:
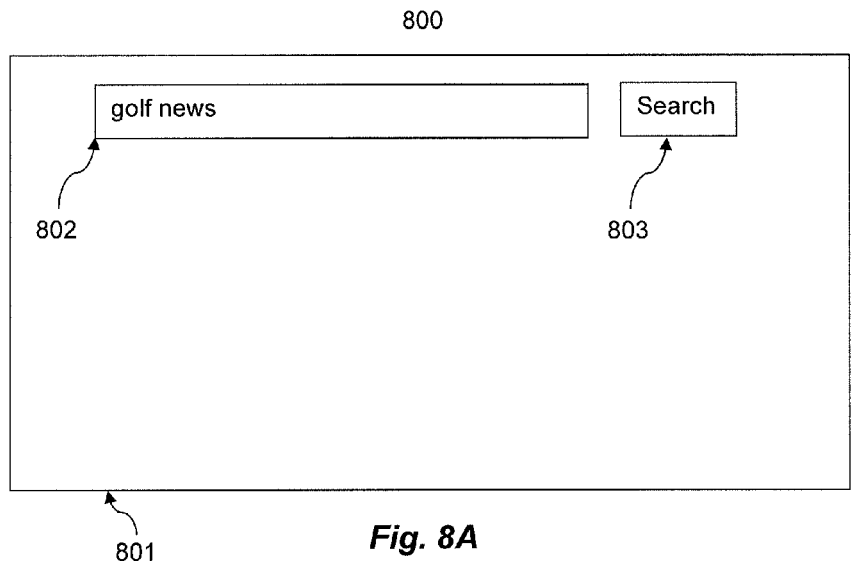
FIG. 8A illustrates an exemplary GUI 800 for implementing embodiments and aspects of the present disclosure.

FIG. 8A illustrates an exemplary GUI 800 for implementing embodiments and aspects of the present disclosure. In some embodiments, GUI 800 may be displayed on a website or client device (e.g., website 101 or client 102, with reference to FIG. 1). The website or client device may include a portion or frame of the display 801 devoted to rendering the GUI. GUI 800 may include one or more search fields 802, in which users may enter search terms. In some embodiments, users may also have the option of specifying query conditions (e.g., Boolean conditions, query filters like publication date or author, etc.). GUI 800 may include a search button 803, which may trigger a search request to be sent, with reference to FIG. 1, through communications medium 104 to an appropriate server (e.g., query server 108) for processing (e.g., at query server 108 and/or processor 109).

Figure 8B:
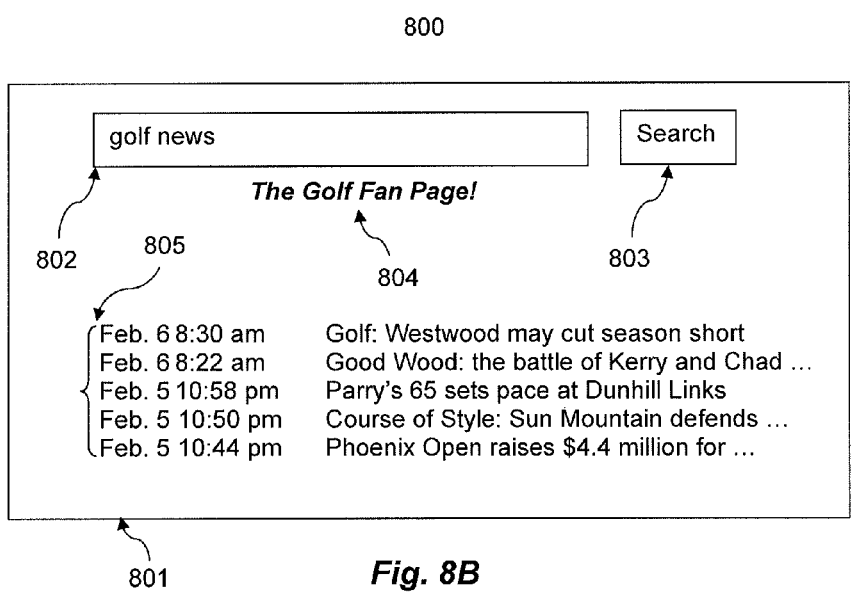
FIG. 8B illustrates an exemplary embodiment of GUI 800, where a user query of "golf news" has been entered into search field 802 and requested by button 803.

FIG. 8B illustrates an exemplary embodiment of GUI 800, where a user query of "golf news" has been entered into search field 802 and requested by button 803. In some embodiments, the query may lead the user to a golf "fan" page, which may be a webpage designed for golf fans that contains, inter alia, golf news. The webpage may have a title 804 of "The Golf Fan Page!". The query results (e.g., as output in step 507 of FIG. 5) may be presented in a results field 805. In some embodiments, as shown in GUI 800, the results may indicate the date and time they were published. Users may click on the search results (e.g., as hyperlinks), to navigate to the individual search results. Various other types of displays of query results are possible as well, such as links in addition to images or video associated with the links, advertisements associated with links, etc.

It will be apparent to those skilled in the art that various modifications and variations can be made to the exemplary embodiments disclosed herein. It is intended that the examples be considered as exemplary embodiments only, with a true scope of the disclosed embodiments being indicated by the following claims and their equivalents. Further, it is to be understood that while the foregoing discussion may have referenced singular components (e.g., servers, databases, devices) in some instances, such components may be implemented using a plurality of such components to achieve similar to additional functionality. Further, it is to be understood that the above described hardware components (e.g., servers, communications devices, storage media, etc.), may be tangible hardware components, comprising memory devices (e.g., RAM, ROM, etc.), and may be configured to perform the functions and processes described above. Further, it should be recognized that the exemplary processes described herein are only exemplary, and may be performed with additional steps, fewer steps, and/or in different sequences than described above.

What is claimed is:

1. A computer-implemented method of querying a database, comprising:
    receiving, at a server, a query from a client;
    applying a default query range to the query;
    executing the query upon the database in a first execution, wherein the query is executed using an index comprising a category of information stored in the database and is executed subject to the default query range;
    determining if the number of query results from the first execution is outside a predetermined range;
    when it is determined that the number of query results from the first execution is outside the predetermined range, adjusting the query range to obtain a number of query results closer to or within the predetermined range;
    executing the query upon the database in a second execution, wherein the query is executed using the index comprising the category of information stored in the database and is executed subject to the adjusted query range;
    determining whether the query has been executed upon the database a number of times that exceeds a preset threshold;
    in response determining that the query has been executed upon the database a number of times that exceeds the preset threshold, determining whether to send the query results obtained from the second execution of the query to the client.

2. The computer-implemented method of claim 1, further comprising:

determining if the number of query results from the second execution is outside the predetermined range;

when it is determined that the number of query results from the second execution is outside the predetermined range, performing a second adjustment to the query range to obtain a number of query results closer to or within the predetermined range;

executing the query upon the database in a third execution, wherein the query is executed using the index comprising the category of information stored in the database and is executed subject to the secondly adjusted query range; and sending the query results obtained from the third execution of the query to the client.

3. The computer-implemented method of claim 1, further comprising:

determining if the number of query results from the second execution is outside the predetermined range;

when it is determined that the number of query results from the second execution is outside the predetermined range and it is determined that the query has been executed upon the database a number of times that exceeds the preset threshold; and sending the query results obtained from the second execution of the query to the client.

4. The computer-implemented method of claim 3, wherein the preset threshold comprises at least two executions of the query upon the database.

5. The computer-implemented method of claim 1, wherein the default query range and the adjusted query range specify time periods within which data from the database was published.

6. The computer-implemented method of claim 1, wherein the adjusted query range is stored in a look up table accessible for future queries.

7. The computer-implemented method of claim 1, wherein adjusting the query range comprises adjusting the query range in proportion to the number of query results from the first execution that is outside the predetermined range.

8. The computer-implemented method of claim 1, wherein default query range is associated with the category of information stored in the database.

9. The computer-implemented method of claim 1, wherein the category of information stored in the database comprises multiple genres of information, and wherein the default query range is associated with the multiple genres of information.

10. The computer-implemented method of claim 1, wherein determining if the number of query results from the first execution is outside a predetermined range comprises:

determining a query range ratio, based on the first execution, which is expressed in documents per time;

comparing the query range ratio to a threshold query range ratio; and determining that the query range ratio exceeds the threshold query range ratio.

11. A computer-based system comprising at least one processor and one or more storage media storing a plurality of instructions, the plurality of instructions being executable by the at least one processor for:

receiving a query from a client;

applying a default query range to the query;

executing the query upon the database in a first execution, wherein the query is executed using an index comprising a category of information stored in the database and is executed subject to the default query range;

determining if the number of query results from the first execution is outside a predetermined range;

when it is determined that the number of query results from the first execution is outside the predetermined range, adjusting the query range to obtain a number of query results closer to or within the predetermined range;

executing the query upon the database in a second execution, wherein the query is executed using the index comprising the category of information stored in the database and is executed subject to the adjusted query range;

determining whether the query has been executed upon the database a number of times that exceeds a preset threshold;

in response determining that the query has been executed upon the database a number of times that exceeds preset threshold, determining whether to send the query results obtained from the second execution of the query to the client.

12. The system of claim 11, further comprising instructions executable by the at least one processor for:

determining if the number of query results from the second execution is outside the predetermined range;

when it is determined that the number of query results from the second execution is outside the predetermined range, performing a second adjustment to the query range to obtain a number of query results closer to or within the predetermined range;

executing the query upon the database in a third execution, wherein the query is executed using the index comprising the category of information stored in the database and is executed subject to the secondly adjusted query range; and sending the query results obtained from the third execution of the query to the client.

13. The system of claim 11, further comprising instructions executable by the at least one processor for:

determining if the number of query results from the second execution is outside the predetermined range;

when it is determined that the number of query results from the second execution is outside the predetermined range and it is determined that the query has been executed upon the database a number of times that exceeds the preset threshold; and sending the query results obtained from the second execution of the query to the client.

14. The system of claim 13, wherein the preset threshold comprises at least two executions of the query upon the database.

15. The system of claim 11, wherein the default query range and the adjusted query range specify time periods within which data from the database was published.

16. The system of claim 11, wherein the adjusted query range is stored in a look up table accessible for future queries.

17. The system of claim 11, wherein adjusting the query range comprises adjusting the query range in proportion to the number of query results from the first execution that is outside the predetermined range.

18. The system of claim 11, wherein default query range is associated with the category of information stored in the database.

19. The system of claim 11, wherein the category of information stored in the database comprises multiple genres of information, and wherein the default query range is associated with the multiple genres of information.

20. The system of claim 11, wherein determining if the number of query results from the first execution is outside a predetermined range comprises:

determining a query range ratio, based on the first execution, which is expressed in documents per time;

comparing the query range ratio to a threshold query range ratio; and determining that the query range ratio exceeds the threshold query range ratio.

21. The computer-implemented method of claim 1, wherein determining if the number of query results from the first execution is outside a predetermined range comprises:

determining a query range ratio, based on the first execution, which is expressed in documents per time;

comparing the query range ratio to a threshold query range ratio; and determining that the query range ratio is less than the threshold query range ratio.

22. The system of claim 11, wherein determining if the number of query results from the first execution is outside a predetermined range comprises:

determining a query range ratio, based on the first execution, which is expressed in documents per time;

comparing the query range ratio to a threshold query range ratio; and determining that the query range ratio is less than the threshold query range ratio.

\* \* \* \* \*